3,414,567
2 - [2 - (5 - NITRO - 2 - FURYL) - VINYL] - PYRIDINE-N-OXIDES AND PROCESSES FOR PREPARING THEREOF
Shinsaku Minami, Yamatokoriyama-shi, Akio Fujita, Iberagi-shi, and Jun-Ichi Matsumoto, Osaka-shi, Japan, assignors to Dainippon Pharmaceutical Co., Ltd., Osaka, Japan, a corporation of Japan
No Drawing. Filed Nov. 9, 1964, Ser. No. 409,930
Claims priority, application Japan, Nov. 11, 1963, 38/62,211
7 Claims. (Cl. 260—240)

This invention relates to 2-[2-(5-nitro-2-furyl)-vinyl]-pyridine-N-oxides and processes for preparing thereof.

According to the present invention, there are provided new compounds of the formula

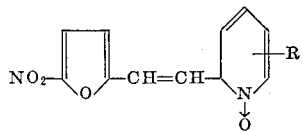
(I)

wherein R is alkyl having 1 to 3 carbon atoms.

The alkyl radicals referred to above can be methyl, ethyl, propyl, or iso-propyl.

The new compounds of the Formula I have high activities against important Gram positive and Gram negative strains of pathogenic bacteria, such as *Micrococcus pyogenes* var. *aureus*, *Escherichia coli*, and *Shigella flexneri*. Further, the compounds have antimycotic and antitrichomonal activities. It can be expected that the compounds are useful in the treatment of bacterial, fungal and protozoal infections in man and domestic animals.

The compounds of the Formula I are conveniently prepared by condensing 5-nitrofurfural and a compound of the formula

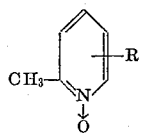
(II)

wherein R has the meaning given before, in the presence of acetic anhydride. This reaction can be easily effected at room temperature or, if necessary, an elevated temperature. The reaction may be promoted by adding a small portion of alkali salt of acetic acid, such as potassium acetate.

An alternate method for preparing the compounds of the Formula I comprises the oxidation of a compound having the formula

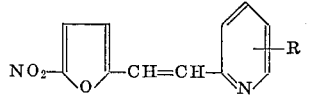
(III)

wherein R has the meaning given before. This oxidation can be effected by hydrogen peroxide or organic peroxide at room temperature or, if necessary, an elevated temperature. In this reaction an inert solvent, such as water and alcohols may be used. But the most preferable method is to be oxidized by hydrogen peroxide in glacial acetic acid.

The starting materials, for use in the alternate process, can be prepared by condensation of nitrofurfural and a compound having the formula

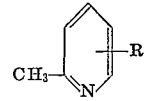
(IV)

wherein R has the meaning given before, in the presence of acetic anhydride at an elevated temperature.

The starting materials, for use in the alternate process, are prepared also by nitration of a compound having the formula

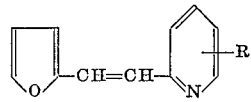
(V)

wherein R has the meaning given before, according to a process which itself is well known.

The following examples are given to illustrate the practice of the present invention, but are not to be construed as limiting.

EXAMPLE 1

A mixture of 2.8 g. of 5-nitrofurfural and 2.7 g. of 2-methyl-5-ethylpyridine-N-oxide and 6.2 g. of acetic anhydride is heated for 4 hours at 70 to 80° C. The excess acetic anhydride is distilled off under reduced pressure and the residue is extracted with 10% aqueous hot hydrochloric acid. After cooling, the solution is neutralized with sodium bicarbonate and extracted with chloroform. The solvent is evaporated and the residue, after chromatography in acetone on alumina, is recrystallized from ethanol to give 1.6 g. of 2-[2-(5-nitro-2-furyl)-vinyl]-5-ethylpyridine-N-oxide, M.P. 162–163.

EXAMPLE 2

A mixture of 2.8 g. of 5-nitrofurfural, 1.0 g. of anhydrous potassium acetate, 2.7 g. of 2-methyl-5-ethylpyridine-N-oxide and 6.2 g. of acetic anhydride is heated for 4 hours at 70–80° C. The mixture, after adding water, is extracted with chloroform. After evaporating the chloroform, the residue is extracted with 10% aqueous hydrochloric acid, neutralized with sodium bicarbonate and extracted with chloroform. After evaporating the chloroform, the crystals which separate on cooling are recrystallized from ethanol to give 2.1 g. of 2-[2-(5-nitro-2-furyl)-vinyl]-5-ethylpyridine-N-oxide, M.P. 162–163.

In a similar manner, there is obtained 2-[2-(5-nitro-2-furyl)-vinyl]-5-methylpyridine - n - oxide, M.P. 225–226 (dec.).

EXAMPLE 3

A mixture of 2.8 g. of 5-nitrofurfural, 2.5 g. of 2,6-dimethylpyridine-N-oxide and 6.2 g. of acetic anhydride is allowed to stand at room temperature for 30 minutes and then heated for 5 hours at 70° C. After concentrating the mixture, the crystals which separate on neutralizing the mixture with aqueous sodium bicarbonate are washed with water, dried and recrystallized from methanol to give 1.6 g. of 2-[2-(5-nitro-2-furyl)-vinyl]-6-methylpyridine-N-oxide, M.P. 207–208 (dec.).

In a similar manner, there is obtained 2-[2-(5-nitro-2-furyl)-vinyl]-3-methylpyridine-N-oxide, M.P. 198–200° C. (dec.).

EXAMPLE 4

A mixture of 2.8 g. of 5-nitrofurfural, 2.5 g. of 2,4-dimethylpyridine-N-oxide and 6.2 g. of acetic anhydride is allowed to stand at room temperature for 40 hours. Water is added to the mixture and the crystals which separate on neutralizing the mixture with aqueous sodium bicarbonate are recrystallized from acetone to give 1.6 g. of 2-[2-(5-nitro-2-furyl)-vinyl]-4-methylpyridine-N-oxide, M.P. 213° C. (dec.).

EXAMPLE 5

A mixture of 2.8 g. of 5-nitrofurfural and 2.1 g. of 2,5-dimethylpyridine in 2.0 g. of acetic anhydride was heated for 2.5 hours at 130–140° C. After evaporating the acetic anhydride, the residue is extracted with aqueous hot hydrochloric acid and the extract is neutralized with sodium bicarbonate. The product is washed with water, dried and recrystallized with aqueous ethanol to give 2.2 g. of 2-[2-(5 - nitro - 2-furyl)-vinyl]-5-methylpyridine, M.P. 174–176° C.

In a similar manner, there are obtained 2-[2-(5-nitro-2-furyl)-vinyl]-5-ethylpyridine, M.P. 103–105° C., 2-[2-(5-nitro-2-furyl)-vinyl]-3-methylpyridine, M.P. 192–193° C. and 2-[2-(5-nitro-2-furyl)-vinyl]-6-methylpyridine, M.P. 156–157° C.

EXAMPLE 6

A mixture of 1.5 g. of fuming nitric acid (specific gravity 1.50) and 30 g. of acetic anhydride is cooled to the temperature below −6° C. and to it 1.0 g. of 2-(2-furyl-vinyl)-5-methylpyridine is added in small portions, and then the mixture is stirred for 3 hours at this temperature. The mixture is poured onto ice and concentrated under reduced pressure to give crystalline nitrate. The product is dissolved in water and neutralized with sodium bicarbonate. The crystals which separate out are recrystallized from ethanol to give 0.65 g. of 2-[2-(5-nitro-2-furyl)-vinyl]-5-methylpyridine, M.P. 174–176.

EXAMPLE 7

To a solution of 2 g. of 2-[2-(5-nitro-2-furyl)-vinyl]-5-methylpyridine in 25 cc. of glacial acetic acid, 2.5 cc. of 30% aqueous hydrogen peroxide is added and the solution is heated for 10 hours at 70–80° C. After evaporating the glacial acetic acid, water is added to the residue. The crystals which separate out are recrystallized from acetone to give 1.7 g. of 2-[2-(5-nitro-2-furyl)-vinyl]-5-methylpyridine-N-oxide, M.P. 225–226° C. (dec.).

In a similar manner, there is obtained 2-[2-(5-nitro-2-furyl)-vinyl]-6-methylpyridine-N-oxide, M.P. 207–208° C. (dec.).

EXAMPLE 8

To a solution of 15 g. of 2-[2-(5-nitro-2-furyl)-vinyl]-5-ethylpyridine in 125 cc. of glacial acetic acid, 19 cc. of 30% aqueous hydrogen peroxide is added and the solution is heated for 3 hours at 70° C. After cooling, the solution is concentrated to a half volume. The crystals which separate out on addition of water to the solution, are recrystallized from aqueous ethanol to give 12 g. of 2 - [2 - (5 - nitro-2-furyl)-vinyl]-5-ethylpyridine-N-oxide, M.P. 162–163° C.

In a similar manner, there is obtained 2-[2-(5-nitro-2-furyl)-vinyl]-3-methylpyridine-N-oxide, M.P. 198–200° C. (dec.).

What is claimed is:

1. A compound of the formula

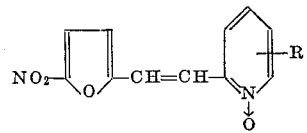

wherein R is alkyl having 1 to 3 carbon atoms.

2. 2 - [2 - (5-nitro-2-furyl)-vinyl]-5-methylpyridine-N-oxide.
3. 2 - [2 - (5 - nitro - 2-furyl)-vinyl]-5-ethylpyridine-N-oxide.
4. 2 - [2 - (5-nitro-2-furyl)-vinyl]-6-methylpyridine-N-oxide.
5. 2 - [2 - (5-nitro-2-furyl)-vinyl]-3-methylpyridine-N-oxide.
6. 2 - [2 - (5-nitro-2-furyl)-vinyl]-4-methylpyridine-N-oxide.

7. A process for preparing a compound of the formula

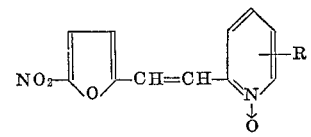

wherein R is alkyl having 1 to 3 carbon atoms, which comprises condensing 5-nitrofurfural and a compound of the formula

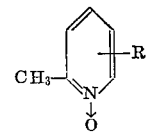

wherein R has the meaning given before, in the presence of acetic anhydride to thereby yield the said first-mentioned compound.

References Cited

FOREIGN PATENTS

| | | |
|---|---|---|
| 613,604 | 8/1962 | Belgium. |
| 615,319 | 9/1962 | Belgium. |
| 925,569 | 5/1963 | Great Britain. |

OTHER REFERENCES

Takahashi et al., J. Pharm. Soc. Japan, vol. 72, pp. 463–467 (1952).

Cheronis et al., "Semimicro Qualitative Organic Analysis," pp. 146 and 311–312, Thomas Y. Crowell Co., N.Y. (1947).

JOHN D. RANDOLPH, *Primary Examiner.*

UNITED STATES PATENT OFFICE
CERTIFICATE OF CORRECTION

Patent No. 3,414,567

December 3, 1968

Shinsaku Minami et al.

It is certified that error appears in the above identified patent and that said Letters Patent are hereby corrected as shown below:

In the heading to the printed specification, lines 10 and 11, "Nov. 11, 1963, 38/62, 211" should read -- Nov. 19, 1963, 62, 211/63 --. Column 2, line 50, "-n" should read ---N --.

Signed and sealed this 10th day of March 1970.

(SEAL)
Attest:

Edward M. Fletcher, Jr.
Attesting Officer

WILLIAM E. SCHUYLER, JR.
Commissioner of Patents